United States Patent [19]
Rutkowski et al.

[11] Patent Number: 5,572,101
[45] Date of Patent: Nov. 5, 1996

[54] PROGRAMMABLE ONE-TOUCH-DOWN POWER WINDOW

[75] Inventors: David J. Rutkowski, Grosse Ile; Mohammad H. Arghavani-Badrabadi, Walled Lake, both of Mich.

[73] Assignee: Ford Motor Company, Dearborn, Mich.

[21] Appl. No.: 348,402

[22] Filed: Dec. 2, 1994

[51] Int. Cl.$^6$ ............................................. H02P 1/22
[52] U.S. Cl. ........................ 318/470; 318/466; 318/265; 49/349
[58] Field of Search ............................ 318/DIG. 2, 265, 318/470, 266, 282, 468, 434, 565, 469, 466, 444, 467, 473, 280; 49/28, 349, 352, 199

[56] References Cited

U.S. PATENT DOCUMENTS

| | | | |
|---|---|---|---|
| 4,476,416 | 10/1984 | Licata et al. . | |
| 4,481,450 | 11/1984 | Watanabe | 318/444 |
| 4,628,636 | 12/1986 | Folger | 49/199 |
| 4,678,975 | 7/1987 | Vrabel et al. . | |
| 4,683,975 | 8/1987 | Booth et al. | 318/280 |
| 5,399,950 | 3/1995 | Lu et al. | 318/565 |
| 5,404,673 | 4/1995 | Takeda et al. | 318/470 |
| 5,483,135 | 1/1996 | Parks | 318/469 |
| 5,488,276 | 1/1996 | Nishibe | 318/473 |

*Primary Examiner*—John W. Cabeca
*Attorney, Agent, or Firm*—Mark S. Sparschu

[57] ABSTRACT

A power window system equipped with a "one-touch-down" feature for a motor vehicle includes provisions for programming the system to enable and/or disable the one-touch-down feature. The programming is done via a sequence of commands provided to the controller of the one-touch-down feature from various switches on the motor vehicle. In the preferred embodiment of the present invention, all such commands are issued from devices already on the vehicle to perform functions other than programming of the "one-touch-down" feature.

11 Claims, 5 Drawing Sheets

PROGRAMMABLE ONE-TOUCH-DOWN POWER WINDOW

BACKGROUND OF THE INVENTION

1. Field of the Invention

The present invention relates to one-touch-down power window control for a motor vehicle.

2. Description of the Related Art

A feature offered on some motor vehicles is a "one-touch-down" power window system. Issuing the appropriate command to such a power window system will cause the window to travel all the way to the bottom of its travel without constant pressing of the power window switch. A typical command to initiate this "one-touch-down" travel is a short (e.g., less than 0.5 second) momentary depression of the power window down switch.

However, where the operator of the power window wishes only a slight opening of his window, he can encounter a problem. A short depression of the power window switch to slightly open the window may very well invoke "one-touch-down" window travel. Thus, where the operator desired only a slight opening of the window, the window instead opens all the way.

For some people (for example, tobacco smokers), attempting to slightly open the window can be a frequent occurrence. For those people, therefore, the problem described above can provide a frequent annoyance.

Therefore, a means to selectively enable and disable the "one-touch-down" feature of a power window system will provide advantages over the prior art.

SUMMARY OF THE INVENTION

The present invention provides a programming method for a power window system of a motor vehicle, the power window system equipped to provide a one-touch-down feature. The programming method comprises the step of accepting commands regarding a desired change of state of the power window system from one-touch-up feature ENABLED to DISABLED or from DISABLED to ENABLED. The programming method further includes the step of changing the state of the power window system in accordance with the commands.

The present invention also provides a second programming method for a power window system of a motor vehicle the vehicle containing a key-in-ignition switch, a power window control switch, two front door switches and an ignition switch with an "OFF" position, the power window system equipped to provide a one-touch-down feature. The programming method includes the step of monitoring both front door switches to indicate that both doors are closed. The programming method further includes the step of monitoring the ignition switch to indicate that it is in the "OFF" position. Additionally, the programming method comprises the step of monitoring the key-in-ignition switch to indicate that no ignition key is in the ignition. The programming method also includes the steps of monitoring for the pressing and holding of the power window control switch and monitoring for insertion of an ignition key into the ignition within a predetermined time after the power window control switch is pressed and while the power window control switch is being held. Also, the programming method comprises the step of monitoring for release of the power window control switch within a predetermined time after the ignition key is inserted into the ignition. Further, the programming method includes the step of changing the state of the power window system from one-touch-down feature ENABLED to DISABLED or from DISABLED to ENABLED.

The present invention also provides a power window system programming apparatus for a power window system of a motor vehicle, the power window system equipped to provide a one-touch-down feature. The apparatus comprises means for accepting commands regarding a desired change of state of the power window system from one-touch-down feature ENABLED to DISABLED or from DISABLED to ENABLED. The apparatus also includes means for changing the state of the power window system in accordance with the commands.

The present invention allows programming of a power window system to ENABLE and/or DISABLE a one-touch-down feature. In doing so, potential customer annoyances with the operation of a one-touch-down feature can be avoided. The present invention thus provides advantages over the prior art.

DETAILED DESCRIPTION OF THE PREFERRED EMBODIMENT

Figure 1:
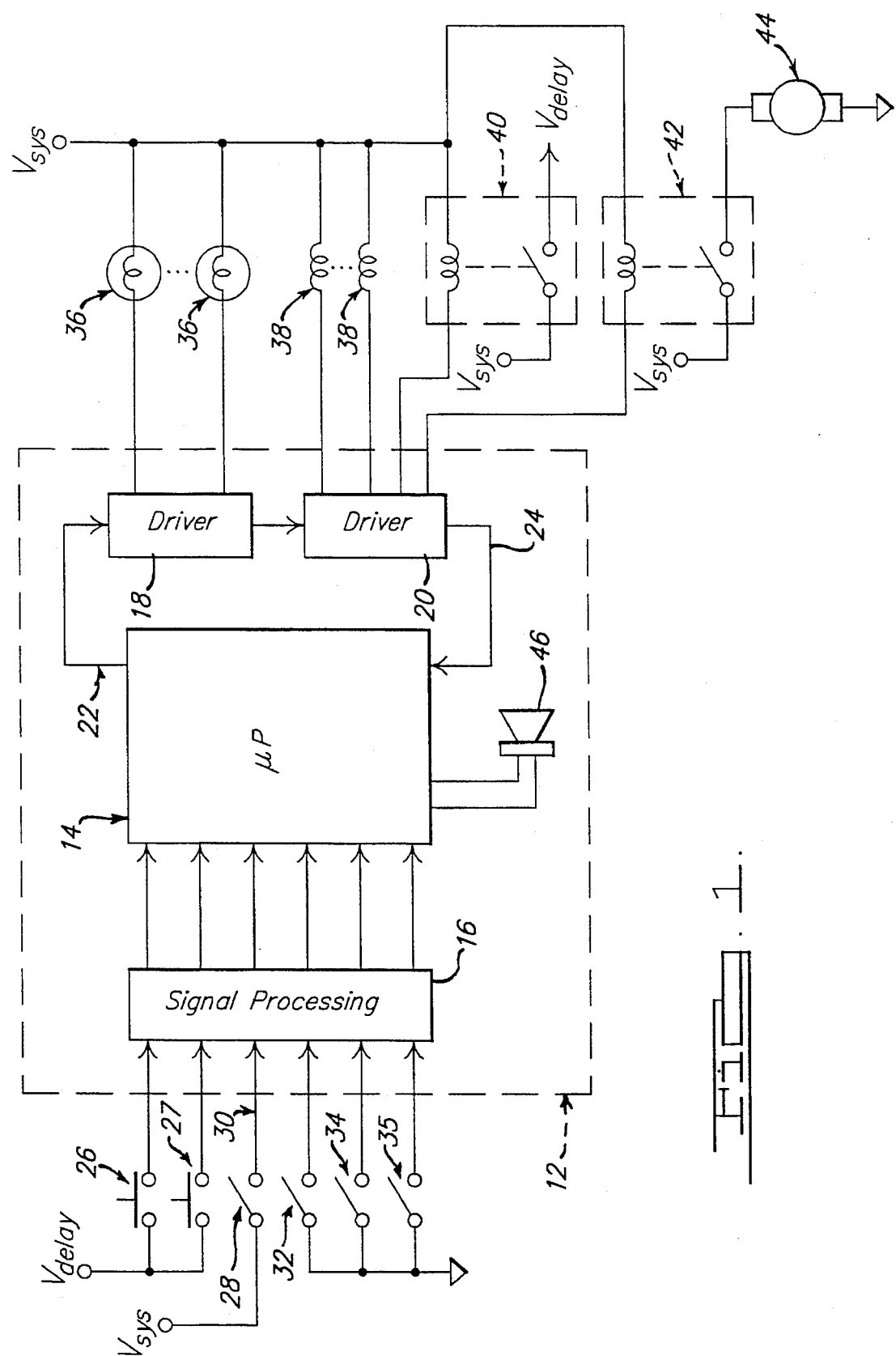
FIG. 1 is a block diagram of a system 10 according to one embodiment of the present invention.

Referring to FIG. 1, a system 10 according to one embodiment of the present invention is illustrated. System 10 comprises controller 12. Controller 12 has the responsibility for controlling the one-touch-down power window feature of a motor vehicle. (Controller 12 also may control a plurality of other features of the motor vehicle as well.) In typical one-touch-down power window control, the operator of the vehicle presses the power window down switch for a pre-determined time. After that time, the operator can release the switch and the window will continue travelling downward until it reaches the end of its travel or until the operator presses the power window up switch or the power window down switch.

Controller 12 comprises microprocessor 14. Microprocessor 14 is preferably a TMS 370 microprocessor from Texas Instruments Corporation. This microprocessor contains 16 kilobytes of on-board read-only memory (ROM), 1 kilobyte of electrically-erasable programmable ROM (EEPROM) and 500 bytes of random-access memory (RAM). It should be noted that the TMS 370 microprocessor described here is only a preferred microprocessor. Any microprocessor having sufficient resources to perform the functions described in this specification will work also.

Controller 12 also comprises signal processing 16. Signal processing 16 provides filtering and voltage division as necessary for the input signals to controller 12. This filtering and voltage division is conventional in the art and will not be described further here.

Controller 12 also comprises output drivers 18 and 20. Drivers 18 and 20 each preferably have a plurality of outputs for driving a plurality of output components. Drivers 18 and 20 receive commands serially via line 22 from microprocessor 14. Drivers 18 and 20 further provide some status information serially via line 24. It should be noted that drivers 18 and 20 each having multiple outputs and being provided data serially are only preferred design considerations. Drivers 18 and 20 can be replaced with individual drivers in like quantity to the numbers of outputs of drivers 18 and 20. Further, data can be transferred in parallel to those drivers.

Input devices providing input signals to controller 12 include driver's power window down switch 26 and driver's power window up switch 27. These switches are connected at one side to delayed accessory power of the vehicle and at the other side to controller 12. ("Delayed accessory power" will be described further below.) Driver's power window down switch 26, if held for a predetermined time, indicates to controller 12 that the driver wishes his power window lowered in "one-touch-down" fashion.

Note that driver's power window down switch 26 and driver's power window up switch 27 are also preferably hard-wired to power window motor 44, the hard-wiring not shown in FIG. 1 for the sake of clarity of the drawing. In manual (i.e., non-one-touch-down) operation of the power window, current for power window motor 44 is supplied directly from switches 26 and 27 in a manner conventional in the art of power windows. In one-touch-down mode, one-touch-down relay 42 provides power to power window motor 44.

Another input to controller 12 is ignition switch 28. Ignition switch 28 actually has a number of positions e.g., "OFF", "RUN", "CRANK", etc.) In FIG. 1, only the contact of ignition switch 28 which is closed in the "RUN" position is illustrated. That is, circuit 30 is connected to $V_{sys}$ (system voltage, nominally 12 volts) when ignition switch 28 is in the RUN position, and not connected to $V_{sys}$ otherwise.

Another device providing an input signal to controller 12 is key-in-ignition switch 32. Key-in-ignition switch 32 is closed if an ignition key is physically inserted into the ignition switch. Another input to controller 12 is driver's door switch 34, which is closed if the driver's door is open. Yet another input to controller 12 is front passenger's door switch 35, which is closed if the front passenger's door is open (or the only passenger door if the vehicle is a two-door vehicle).

Output devices connected to controller 12 comprise a number of lamps 36, which are indicators for various functions performed by controller 12 (recall that controller 12 can control a plurality of functions of the motor vehicle). Output devices connected to controller 12 also comprise a number of actuators 38, which can be relay coils and other types of actuators for the various functions performed by controller 12.

Another output device connected to controller 12 is delayed accessory relay 40. This relay allows the power windows of the vehicle to be operated for a predetermined amount of time after the vehicle's ignition switch is turned off. More specifically, delayed accessory relay 40 is actuated if both front doors of the vehicle are closed and the ignition is turned from "RUN" to "OFF". If either front door is subsequently opened or if the predetermined delayed accessory time has elapsed, delayed accessory relay 40 opens.

Another output device connected to controller 12 is one-touch-down relay 42. This relay is actuated, energizing driver's power window motor 44, for as long as controller 12 decides that the driver's power window should be lowered in one-touch-down fashion.

An output device contained within controller 12 is tone generator 46. Tone generator 46 generates a tone audible to persons inside the vehicle upon command from microprocessor 14.

Figure 2:
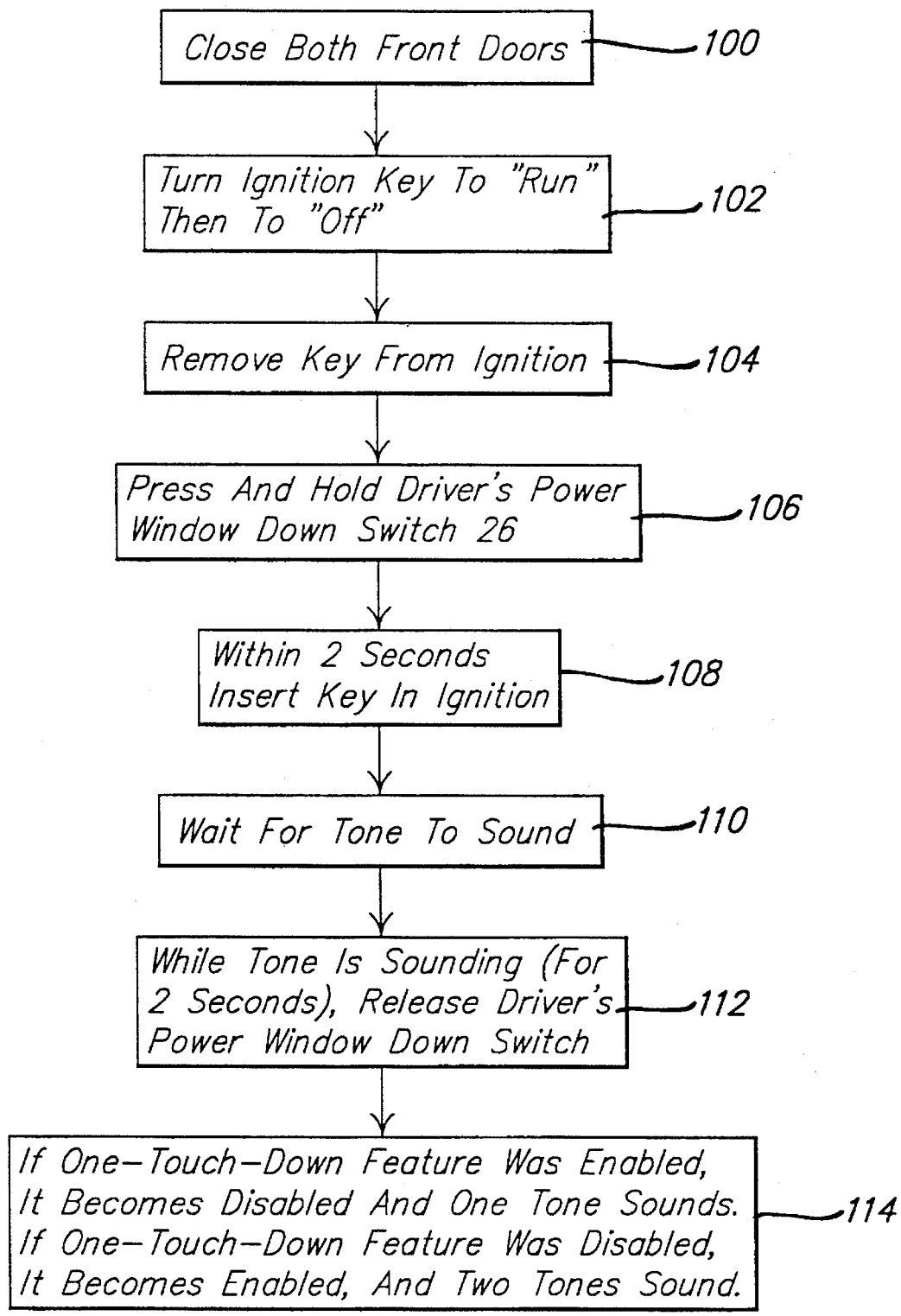
FIG. 2 is a one-touch-down power window programming procedure according to one embodiment of the present invention.

If the operator wishes the one-touch-down feature to be DISABLED (i.e., one-touch-down mode not to be entered even if driver's power window down switch 26 is held for the appropriate time), he can follow the programming procedure detailed in FIG. 2. Each subsequent time the procedure is performed, the ENABLED/DISABLED state of the one-touch-down feature is "toggled" (i.e., DISABLED if the feature is currently ENABLED and ENABLED if the feature is currently DISABLED). Referring to FIG. 2, the programming procedure will be described. The operator first makes sure that both front doors of the vehicle are closed (step 100). Next, ignition switch 28 (FIG. 1) is turned to "RUN" and then to "OFF" (step 102). Next, the operator removes the key from the ignition (step 104).

Following the above steps, the operator presses and holds driver's power window down switch 26 (step 106). While holding the switch down, the operator within two seconds re-inserts the ignition key into the ignition (step 108). The operator then waits for a tone to sound (step 110). While the tone is sounding (and it will sound for two seconds), the operator releases the driver's power window down switch (step 112).

If steps 100–112 are performed, the ENABLED/DISABLED state of the one-touch-up feature will be "toggled" (step-114). If the new state is ENABLED, two tones will sound. If the new state is DISABLED, one tone will sound.

A distinct advantage of the programming procedure just described is that it is carried out completely with switches already in the vehicle to perform functions other than programming of the one-touch-down feature. Therefore, the programmability is provided with no additional cost for switches to carry out the programming.

The algorithm performed by controller 12 in supervising the above programming procedure is illustrated with reference to FIGS. 3A through 3C.

Figure 3A:
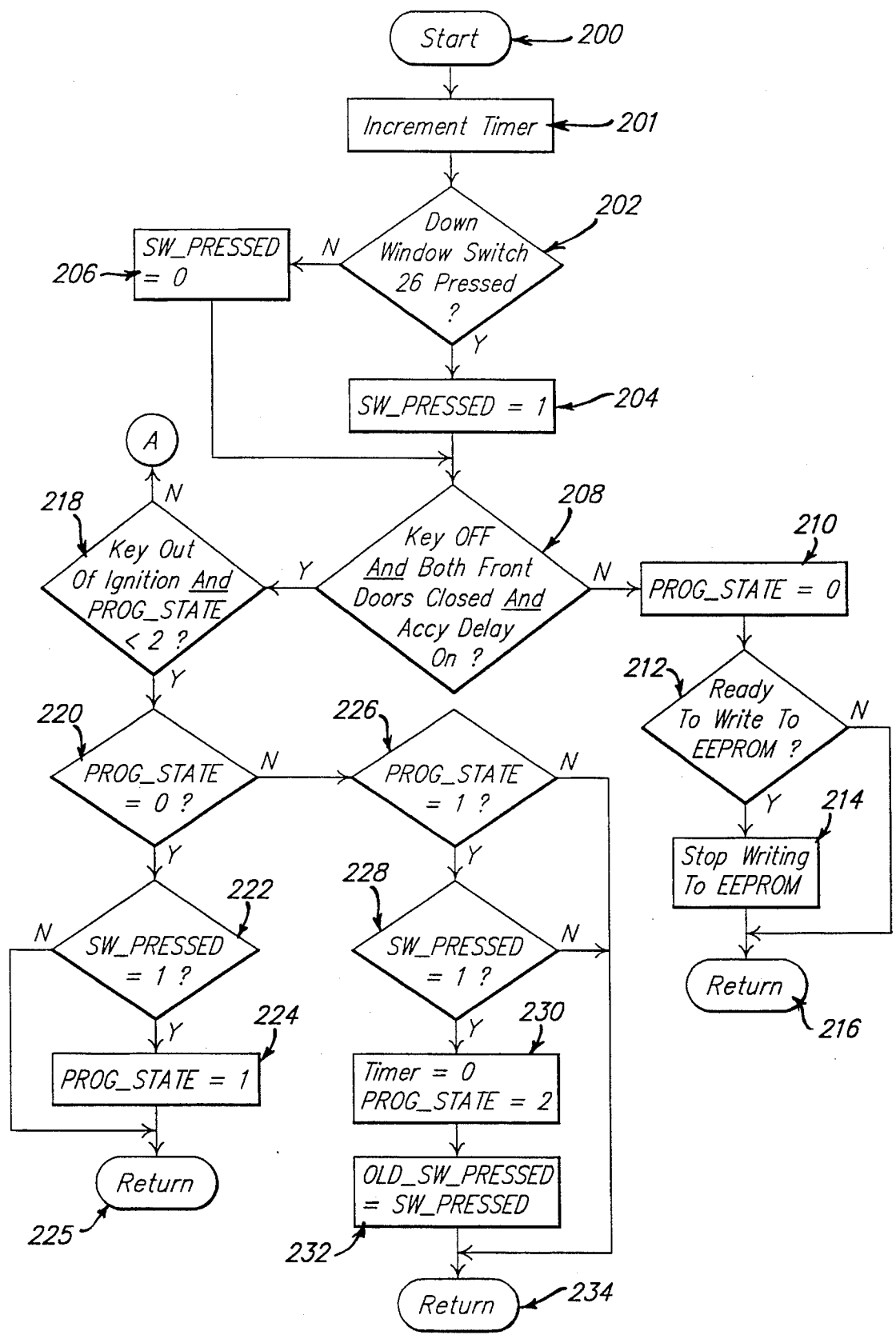
FIG. 3A is a portion of an algorithm executed by controller 12 of FIG. 1, according to one embodiment of the present invention, while supervising the programming procedure of FIG. 2.
Figure 3B:
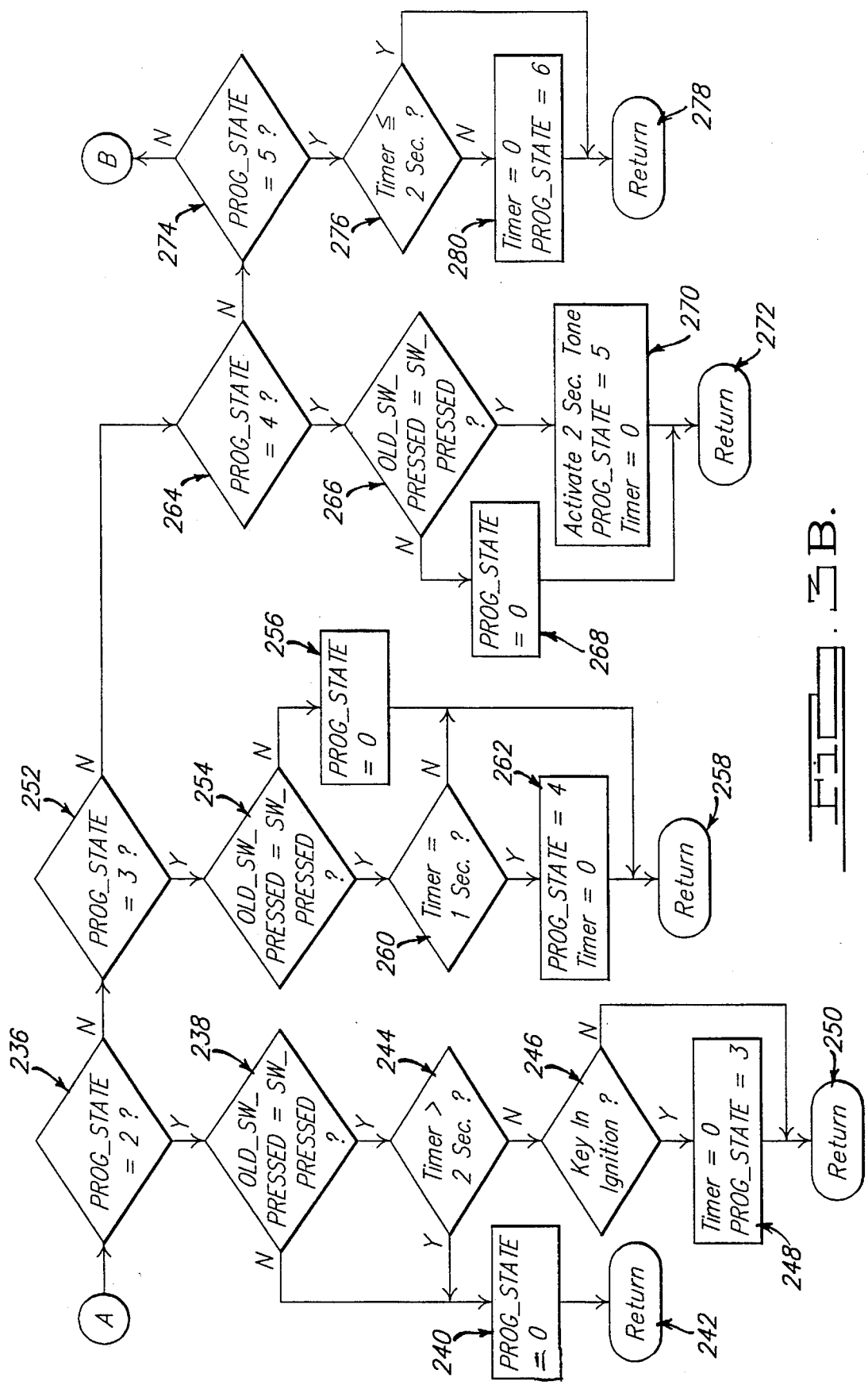
FIG. 3B is a second portion of the algorithm executed by controller 12 of FIG. 1 while supervising the programming procedure of FIG. 2.
Figure 3C:
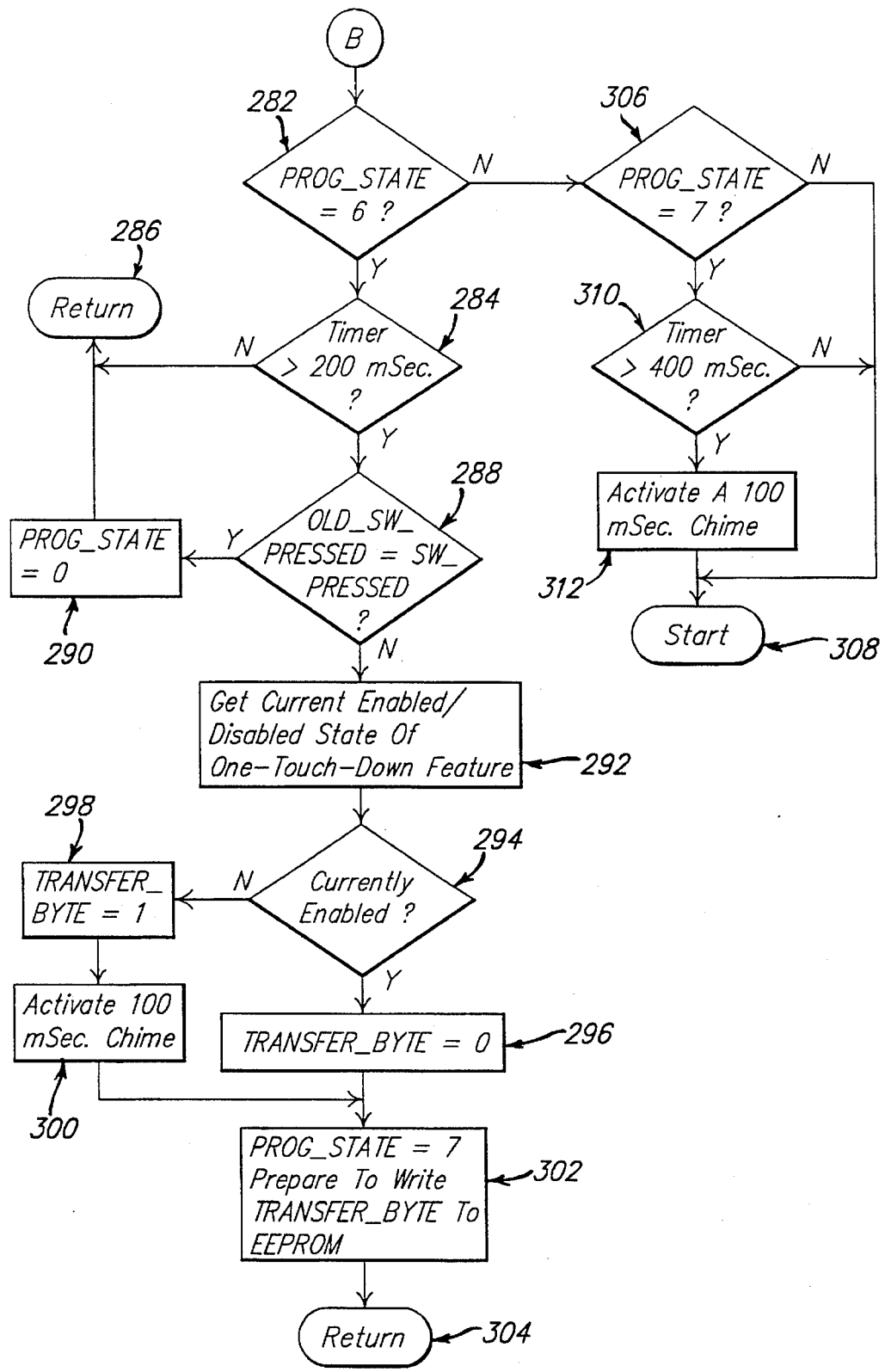
FIG. 3C is a third portion of the algorithm executed by controller 12 of FIG. 1 while supervising the programming procedure of FIG. 2.

Referring first to FIG. 3A, the algorithm starts at step 200. The algorithm is run on a periodic basis, preferably every 20 milliseconds. At step 201, a software timer is incremented. This timer is a location in RAM which is used to measure time for several purposes in this algorithm.

At step 202, the algorithm checks whether driver's power window down switch 26 is pressed. If it is pressed, a SW_PRESSED flag is set at step 204. If not, the SW_flag is cleared at step 206.

At step 208, the algorithm determines whether the ignition key is in the OFF position AND both front doors are closed AND if delayed accessory relay 40 (FIG. 1) is ON. Note that all three of these conditions must be satisfied for steps 100 and 102 of the programming procedure (FIG. 2) to have been correctly performed. If any of the conditions of step 208 are not satisfied, memory location PROG_STATE is set to zero at step 210. (PROG_STATE is a memory location with eight valid values. Each of those values, zero through seven, indicates that the algorithm is in a different state in carrying out the programming of the one-touch-down feature.) PROG_STATE equal to zero, as it is set at step 210, means that the algorithm is not engaged in the programming of the one-touch-down feature.

At step 212, the algorithm checks if a write to EEPROM was about to happen due to the algorithm having progressed into PROG_STATE six (PROG_STATE six will be described below). If such a write were about to happen, it is stopped at step 214, in recognition of the fact that at step 210, the algorithm was forced out of the one-touch-down programming sequence and into PROG_STATE zero. The algorithm then exits at step 216.

If all of the conditions of step 208 are satisfied, the algorithm checks whether the ignition key is out of the ignition and PROG_STATE is less than two (step 218). If YES, the algorithm checks at step 220 whether PROG_STATE is zero. If YES, and if the driver's power window down switch is pressed (step 222), PROG_STATE increments to one and the algorithm is exited.

If at step 220, PROG_STATE was not zero, the algorithm checks at step 226 whether PROG_STATE is one. If YES, and if driver's power down window switch 26 (FIG. 1) is pressed (step 228), the timer is reset and PROG_STATE is incremented to two (step 230). Also, a flag OLD_SW_PRESSED is set equal to the value of the flag SW_PRESSED (step 232). The algorithm is then exited at step 234.

If the result of the test at step 218 was NO, the algorithm proceeds to step 236. (Refer now to FIG. 3B.) At step 236, the algorithm determines whether PROG_STATE is two. If YES, the algorithm checks at step 238 whether OLD_SW_PRESSED equals SW_PRESSED. If not, the operator has released driver's power window down switch 26 (FIG. 1) prior to step 108 of the programming procedure (FIG. 2). PROG_STATE is thus set to zero (step 240) and the algorithm exits at step 242.

If the result of step 238 is YES, the algorithm checks at step 244 whether the timer is greater than two seconds. If YES, the two seconds provided at step 108 of the programming procedure (FIG. 2) for inserting the key in the ignition has been exceeded. PROG_STATE is thus set to zero at step 240 and the algorithm exits at step 242. If the result of step 244 is NO, the two seconds allowed to insert the key in the ignition has not yet run out. Thus, at step 246, the algorithm determines whether the key has been inserted into the ignition. If YES, PROG_STATE advances to three, and the timer is reset to zero (step 248). If no, the algorithm exits at step 250.

If at step 236, the algorithm found that it was not in PROG_STATE two, the algorithm checks to step 252 whether it is in PROG_STATE three. If YES, OLD_SW_PRESSED is compared to SW_PRESSED at step 254. If they are not equal, driver's power window switch 26 (FIG. 1) has been prematurely released. In that case, the algorithm sets PROG_STATE to zero at step 256 and exits at step 258. If instead the result of step 254 was YES, the algorithm checks at step 260 whether the timer is equal to one second. If NO, the algorithm exits at step 258. If YES, PROG_STATE is advanced to four and the timer is reset to zero (step 262). The algorithm then exits at step 258.

If the result of step 252 was NO (i.e., the algorithm was not in PROG_STATE three), the algorithm proceeds to step 264. At step 264, the algorithm checks if PROG_STATE is four. If YES, the algorithm checks if OLD_SW_PRESSED equals SW_PRESSED (step 266). If NO, PROG_STATE is set to zero (step 268), because driver's power window switch 26 (FIG. 1) was released prematurely in the programming sequence (FIG. 2). If YES, a subroutine is called to actuate a two-second tone, PROG_STATE is incremented to five, and the timer is reset to zero (step 270). The algorithm is then exited at step 272.

If the result of step 264 was NO, the algorithm proceeds to step 274, where the algorithm determines whether PROG_STATE is five. If YES, the algorithm proceeds to step 276, where the algorithm checks whether the timer is less than or equal to two seconds. If YES, the two seconds allowed at programming step 112 (FIG. 2) for the operator to release driver's power window down switch 26 (FIG. 1) has not yet expired. The algorithm thus exits at step 278. On the other hand, if the timer is not less than or equal to two seconds at step 278, the timer is reset to zero and PROG_STATE is incremented to six (step 280). The algorithm then exits at step 278.

If the result of step 274 was NO (i.e., the algorithm was not in PROG_STATE five), the algorithm goes to step 282. (Refer now to FIG. 3C.) At step 282, the algorithm checks whether PROG_STATE is six. If YES, the algorithm determines at step 284 whether the timer is greater than 200 milliseconds (step 284). If NO, the algorithm exits at step 286. If YES, the algorithm determines at step 288 whether OLD_SW_PRESSED equals SW_PRESSED. If YES, it is recognized that driver's power window down switch 26 (FIG. 1) has been held too long at programming step 112 (FIG. 2). PROG_STATE is then set to zero at step 290, and the algorithm exits at step 286.

If the result at step 288 was NO, the algorithm advances to step 292. There, the present state of the one-touch-down feature (ENABLED or DISABLED) is retrieved from memory. At step 294, the algorithm examines the present state of the one-touch-down feature and determines whether the feature is presently ENABLED. If YES, flag TRANSFER_BYTE is set to zero, because the one-touch-down feature is now to be DISABLED. IF NO, flag TRANSFER_BYTE is set to one, because the one-touch-down feature is now to be ENABLED. At step 300, a subroutine is called to actuate one 100-millisecond tone.

The algorithm then proceeds to step 302, where PROG_STATE is incremented to seven, and the algorithm prepares to write the flag TRANSFER_BYTE to EEPROM memory. The algorithm then exits at step 304.

If the result of step 282 was NO, (i.e., PROG_STATE was not equal to six), the algorithm advances to step 306. At step 306, the algorithm checks if PROG_STATE is seven. If NO, the algorithm exits at step 308. If YES, the timer is checked to see if it is greater than 400 milliseconds (step 310). If NO, the algorithm exits at step 308. If YES, the algorithm calls a subroutine to actuate a 100-millisecond tone. The algorithm then exits at step 308.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A programming method for a power window system of a motor vehicle, said power window system equipped to provide a one-touch-down feature, said method comprising:

accepting commands regarding a desired change of state of said power window system from one-touch-down feature ENABLED to DISABLED or from DISABLED to ENABLED; and changing the state of the power window system in accordance with said commands;

wherein all said commands are issued from devices already in the vehicle to perform function other than providing commands regarding a desired change of state of said power window system from one-touch-down feature ENABLED to DISABLED or from DISABLED to ENABLED; and wherein said step of accepting commands regarding a desired change of state of said power window system from one-touch-down feature ENABLED to DISABLED or from DISABLED to ENABLED further includes the step of accepting commands from a power window control switch and a key-in-ignition switch.

2. A programming method for a power window system as recited in claim 1, wherein the step of accepting commands includes:

monitoring for a predetermined state of said key-in-ignition switch;

monitoring for a predetermined state of said power window switch;

monitoring for a change of state of said key-in-ignition switch; and monitoring for a change of state of said power window switch.

3. A programming method for a power window system as recited in claim 2, wherein said devices include at least one door switch and an ignition switch; and the step of accepting commands further includes:
monitoring for said at least one door switch to be in a predetermined state; and
monitoring for said ignition switch to be in a predetermined state.

4. A programming method for a power window system as recited in claim 3, wherein the step of monitoring for at least one door switch to be in a predetermined state includes monitoring for said switch to be in said predetermined state for substantially the entire performance of said programming method.

5. A programming method as recited in claim 1, wherein said step of accepting commands regarding a desired change of state of said power window system from one-touch feature ENABLED to DISABLED or from DISABLED to ENABLED further includes the step of accepting all said commands due to a person actuating said devices.

6. A programming method for a power window system of a motor vehicle, said vehicle containing a key-in-ignition switch, a power window control switch, two front door switches and an ignition switch with an "OFF" position, said power window system equipped to provide a one-touch-down feature, said method comprising:

monitoring both front door switches to indicate that both said doors are closed;

monitoring said ignition switch to indicate that it is in said "OFF" position;

monitoring said key-in-ignition switch to indicate that no ignition key is in the ignition;

monitoring for the pressing and holding of said power window control switch;

monitoring for insertion of an ignition key into the ignition within a predetermined time after said power window control switch is pressed and while said power window control switch is being held;

monitoring for release of said power window control switch within a predetermined time after said ignition key is inserted into the ignition; and changing the state of the power window system from one-touch-down feature ENABLED to DISABLED or from DISABLED to ENABLED.

7. A programming method for a power window system as recited in claim 6, further comprising the step of providing an audible signal accompanying said change of state.

8. A programming method for a power window system as recited in claim 7, further comprising the step of issuing an audible signal when said pressing and holding of said driver's window down switch is recognized.

9. A programming method for a power window system of a motor vehicle, said power window system equipped to provide a one-touch feature, said method comprising:

accepting commands regarding a desired change of state of said power window system from one-touch feature ENABLED to DISABLED or from DISABLED to ENABLED; and changing the state of the power window system in accordance with said commands;

wherein all said commands are issued from devices already in the vehicle to perform function other than providing commands regarding a desired change of state of said power window system from one-touch feature ENABLED to DISABLED or from DISABLED to ENABLED; and wherein said step of accepting commands regarding a desired change of state of said power window system from one-touch feature ENABLED to DISABLED or from DISABLED to ENABLED further includes the step of accepting commands from a key-in-ignition switch and a power window control switch.

10. A power window system programming apparatus for power window system of a motor vehicle, said power window system equipped to provide a one-touch-down feature, said apparatus comprising:

means for accepting commands regarding a desired change of state of said power window system from one-touch-down feature ENABLED to DISABLED or from DISABLED to ENABLED; and means for changing the state of the power window system in accordance with said commands;

wherein said motor vehicle contains a key-in-ignition switch and a power window control switch and wherein said means for accepting commands includes:

means for monitoring for a predetermined state of said key-in-ignition switch;

means for monitoring for a predetermined state of said power window switch;

means for monitoring for a change of state of said key-in-ignition switch; and means for monitoring for a change of state of said power window switch.

11. A power window system programming apparatus as recited in claim 10, wherein said motor vehicle further contains at least one door switch and an ignition switch and wherein said means for accepting commands includes:

means for monitoring said at least one door switch to be in a predetermined state; and means for monitoring for said ignition switch to be in a predetermined state.

* * * * *